(12) United States Patent
Shatdal

(10) Patent No.: US 7,725,455 B1
(45) Date of Patent: May 25, 2010

(54) COMPUTING AGGREGATES ON DISTINCT ATTRIBUTE VALUES

(75) Inventor: Ambuj Shatdal, Madison, WI (US)

(73) Assignee: Teradata US, Inc., Miamisburg, OH (US)

( * ) Notice: Subject to any disclaimer, the term of this patent is extended or adjusted under 35 U.S.C. 154(b) by 1333 days.

(21) Appl. No.: 10/751,017

(22) Filed: Dec. 31, 2003

(51) Int. Cl.
*G06F 7/00* (2006.01)
*G06F 17/30* (2006.01)

(52) U.S. Cl. .................................................. 707/713

(58) Field of Classification Search .......... 707/1–104.1, 707/200–206; 714/1–3, 15–20
See application file for complete search history.

(56) References Cited

U.S. PATENT DOCUMENTS

| | | | |
|---|---|---|---|
| 5,640,584 A | 6/1997 | Kandasamy et al. | 712/30 |
| 5,659,725 A | 8/1997 | Levy et al. | 707/3 |
| 5,713,020 A * | 1/1998 | Reiter et al. | 707/102 |
| 5,761,657 A | 6/1998 | Hoang | 707/4 |
| 5,864,842 A | 1/1999 | Pederson et al. | 703/3 |
| 5,872,904 A | 2/1999 | McMillen et al. | 714/4 |
| 5,884,299 A | 3/1999 | Ramesh et al. | 707/2 |
| 6,032,144 A | 2/2000 | Srivastava et al. | 707/3 |
| 6,112,198 A | 8/2000 | Lohman et al. | 707/3 |
| 6,505,189 B1 | 1/2003 | On Au et al. | 707/2 |
| 6,732,096 B1 * | 5/2004 | Au | 707/5 |
| 6,748,392 B1 * | 6/2004 | Galindo-Legaria et al. | 707/102 |
| 6,757,677 B2 | 6/2004 | Pham et al. | 707/5 |

OTHER PUBLICATIONS

Peter Gulutzan & Trudy Pelzer, "SQL-99 Complete, Really," pp. 631-652 (1999).

* cited by examiner

*Primary Examiner*—Jean B Fleurantin
(74) *Attorney, Agent, or Firm*—Trop, Pruner & Hu P.C.

(57) ABSTRACT

A database system computes an aggregate on distinct values of at least one attribute for each of plural groups specified by multiple levels of grouping sets. Distinct values of the at least one attribute are identified and stored in a first table. The first table is used to compute aggregates for groups specified by a first grouping set and for groups specified by a second grouping set.

20 Claims, 2 Drawing Sheets

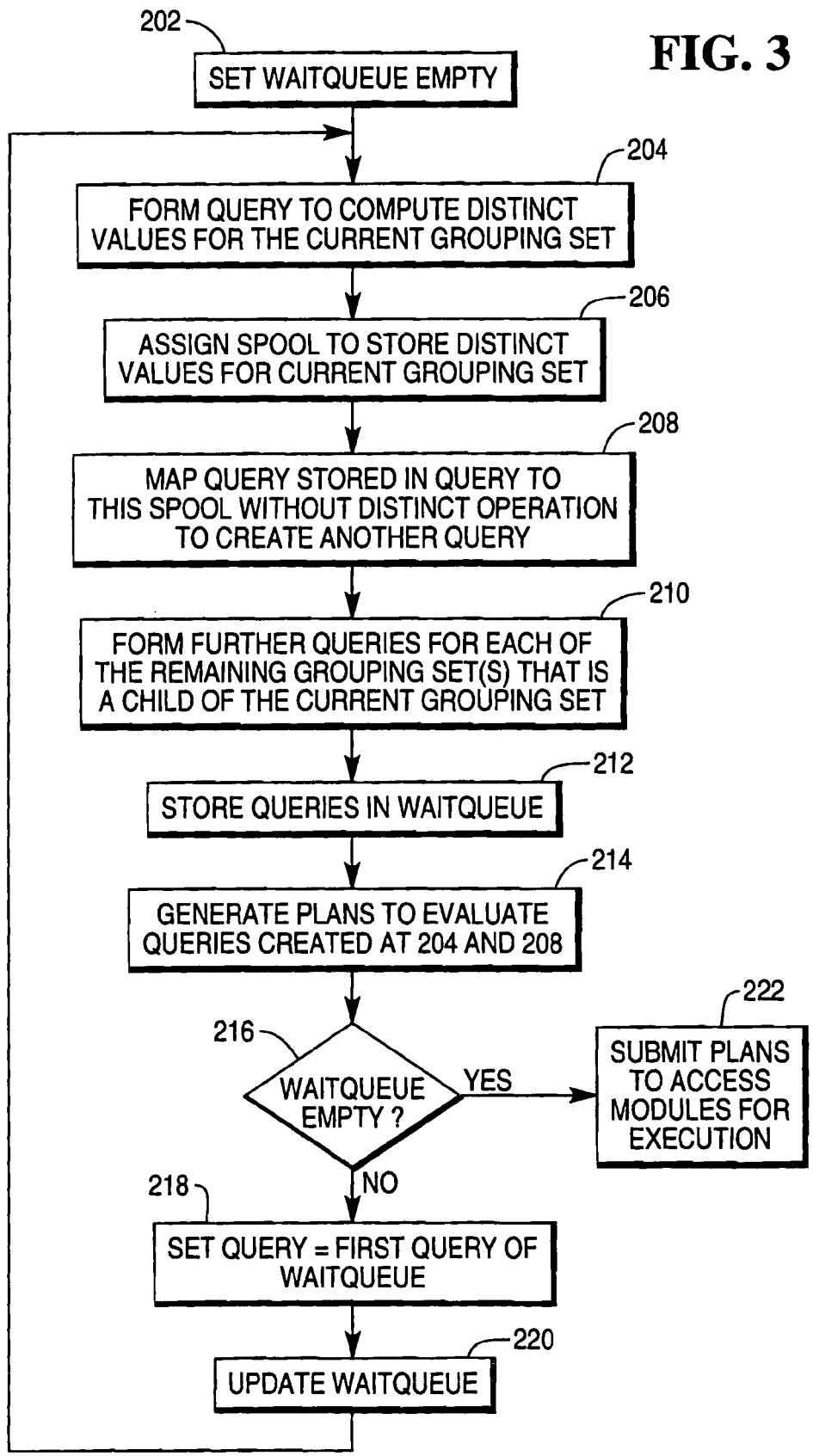

COMPUTING AGGREGATES ON DISTINCT ATTRIBUTE VALUES

BACKGROUND

A database is a collection of logically related data arranged in a predetermined format, such as in tables that contain rows and columns. To access the content of a table in the database, queries according to a standard database query language (such as the Structured Query Language or SQL) are submitted to the database. A query can be issued to insert new entries into a table of a database (such as to insert a row into the table), modify the content of the table, or to delete entries from the table.

Examples of SQL statements include INSERT, SELECT, UPDATE, and DELETE. The SELECT statement is used to retrieve information from a database and to organize information for presentation to a user or to an application program. A SELECT statement can include a GROUP BY clause, which specifies a grouping function to group the output results according to one or more attributes specified in the GROUP BY clause.

Starting with SQL-99 (also referred to as SQL3), further types of group-by operations have been defined, including group-by with grouping sets, group-by with rollup, and group-by with cube. Each of such group-by operations involve multiple grouping sets. Examples of SQL statements that specify a group-by on multiple grouping sets include the following:

SELECT C1, C2, SUM(C3)
From Table a
GROUP BY GROUPING SETS((C1, C2), C1);
SELECT C1, C2, SUM(C3)
FROM TABLE A
GROUP BY ROLLUP(C1, C2);
SELECT C1, C2, SUM(C3)
FROM TABLE A
GROUP BY CUBE(C1, C2);

Each of the group-by operations specified by the above SQL statements involve multiple levels of grouping operations. For example, in the first example statement that contains the GROUP BY GROUPING SETS clause, two grouping sets are specified: group-by on C1, C2, and group-by on C1. The group-by on C1, C2 is considered to be a lower group-by operation than the group-by on C1.

The group-by on the grouping set C1, C2 is calculated from the base table A. For more efficient computation, the group-by on C1 can be calculated from the result of the group-by on C1, C2, rather than from the base table A. This is illustrated with the following sequence of SQL statements. To calculate the group-bys on the multiple grouping sets (C1, C2) and C1, the group-by on grouping set C1, C2, specified by the following statement, is first performed.

SELECT C1, C2, SUM(C3)
FROM A
GROUP BY C1, C2;

The results are stored in a spool file named SPOOL1. The database system then computes a group-by on C1 from the spool file SPOOL1 (rather than from the base table A), as specified by the following statement:

SELECT C1, ?, SUM(C3)
FROM SPOOL1
GROUP BY C1;

Although the approach illustrated above enables efficient computation of group-bys on grouping sets at multiple levels, such a technique cannot be used if the SQL statement specifies that an aggregate be calculated on distinct values of a particular attribute, such as in the following SQL statement:

SELECT C1, C2, SUM(DISTINCT C3)
FROM A
GROUP BY GROUPING SETS ((C1, C2), C1);

The aggregate function SUM(DISTINCT C3) produces a sum of the distinct values of the attribute C3 in table A. Thus, for example, if table A has four rows in which the attribute C3 has the following values: 10, 10, 10, 20, then SUM(DISTINCT C3) produces a sum of 30 (10+20). This is distinguished from performing the sum aggregate on all values of C3, SUM(C3), which produces a sum of 50 (10+10+10+20). The DISTINCT option can also be specified with other types of aggregates, such as AVG, COUNT, and so forth.

If a SQL statement specifies an aggregate on distinct attribute values for group-bys on multiple levels of grouping sets, then the computation of a higher level group-by from the result of a lower level group-by as conventionally done does not produce accurate results.

SUMMARY

In general, methods and apparatus are provided to enable a database system to efficiently and accurately compute aggregates on distinct attribute values for group-by operations involving multiple levels of grouping sets.

Other or alternative features will become apparent from the following description, from the drawings, and from the claims.

BRIEF DESCRIPTION OF THE DRAWINGS

FIG. 3 is a flow diagram of a process for computing aggregates on distinct attribute values for group-bys on multiple levels of grouping sets.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
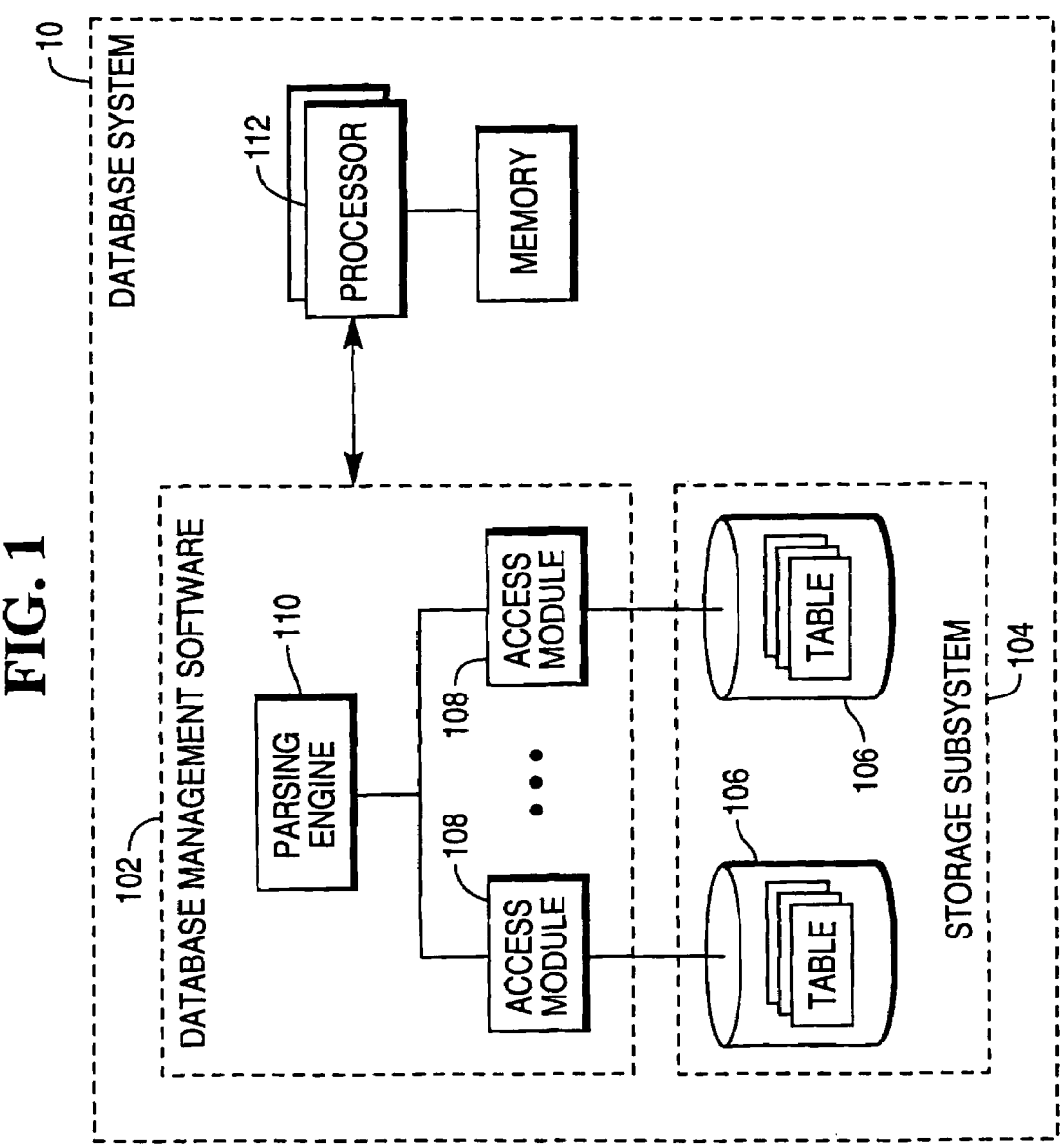
FIG. 1 is a block diagram of an example database system that incorporates an embodiment of the invention.

FIG. 1 illustrates an example arrangement of a database system 10 that is capable of efficiently computing aggregates on distinct attribute values for group-by operations on multiple levels of grouping sets. In one implementation, a group-by operation on multiple grouping sets is invoked by a Structured Query Language (SQL) SELECT statement that has a GROUP BY clause which specifies GROUPING SETS, CUBE, or ROLLUP.

In one example, for a table having attributes A, B, C, and D, the grouping sets specified by an example query may be as follows: A, AB, BC, CD, DE, and DAB. The preceding example involves a group-by operation that includes six grouping sets corresponding to six group-by operations: group-by on A; group-by on A, B; group-by on B, C; group-by on C, D; group-by on D, E; and group-by on D, A, B. The group-by on D, A, B is considered to be a lower level group-by operation than the other group-bys listed above. Similarly, the group-by on A, B is considered to be a lower level group-by operation than the group-by on A.

As shown in FIG. 1, the database system includes a storage subsystem 104 having plural storage modules 106. The storage modules 106 are logical and/or physical partitions of the storage subsystem 104. Base tables (and any intermediate tables such as spools) are stored in the storage modules 106. In the parallel arrangement shown in FIG. 1, each table is distributed across the plural storage modules 106 to enable concurrent access of respective portions of the table. Each table includes multiple attributes (or columns) contained in multiple rows. In the existing discussions, the terms "attribute" and "column" are used interchangeably.

Each storage module 106 is accessible by a respective access module 108 that is part of database management software 102. An access module 108 is capable of performing the following tasks: insert, delete, or modify contents of tables; create, modify, or delete definitions of tables; retrieve information from definitions and tables; and lock databases and tables. In one example, the access modules 108 are based on access module processors (AMPs) used in some TERADATA® database systems from NCR Corporation.

The database management software 102 also includes one or more parsing engines 110. Each parsing engine 110 includes a parser that receives a query (e.g., a SQL query). The parser parses the query and checks the query for proper syntax. Based on the query, the parsing engine 110 generates steps to be performed by the access modules 108, with the parsing engine 110 sending the steps (in the form of instructions or commands) to the access modules 108. In response to the steps received from the parsing engine 10, the access modules 108 perform operations on tables, views, and so forth stored in storage modules 106 in the storage subsystem 104.

The database management software 102 (including the parsing engine 110 and access modules 108), along with other software modules, are executable on one or more processors 112, which are coupled to memory devices 114. Plural processors 112 can be resident on one or plural nodes of the database system 10. In an alternative embodiment, instead of the parallel arrangement of FIG. 1, the database system 10 can be a uni-processing system.

Other components (not shown) of the database system 10 include video components, network communication components to communicate with remote devices coupled over a network, and so forth. Examples of remote devices that can be coupled to the database system 10 are client stations that are capable of issuing queries to the database system 10, with the database system 10 processing the queries and returning the requested data back to the remote client stations.

In accordance with some embodiment of the invention, a mechanism is provided to efficiently compute aggregates over distinct attribute values when specified with a grouping specification, such as by a GROUP BY clause in a SQL statement. For purposes of illustration, assume the following SQL statement is to be computed:

SELECT g, SUM(DISTINCT a)
FROM T
GROUP BY g;

The statement above specifies that the aggregate SUM (DISTINCT a) is to be computed based on groups identified by the grouping attribute g. Note that in this particular example, only one grouping attribute is specified by the GROUP BY clause. An example that involves multiple levels of grouping sets is provided further below.

In response to the SQL statement above, the database system first computes the result of the following query to identify the distinct values of the attribute a:

SELECT g, a
FROM T
GROUP BY g, a;

The result of the operation above is stored in a spool, named SPOOL1. Since the spool now contains only distinct values of the attribute a, a more conventional aggregate computation can then be performed according to the following query:

SELECT g, SUM(a)
FROM SPOOL1
GROUP BY g;

In this SQL statement, the aggregate is specified as SUM (a) instead of SUM(DISTINCT a) since the source table is SPOOL1, which contains only distinct values of the attribute a. The result of this last statement produces the desired result of the original statement. The technique illustrated above is applied to computing aggregates on distinct attribute values for group-bys on multiple levels of grouping sets.

Figure 2:
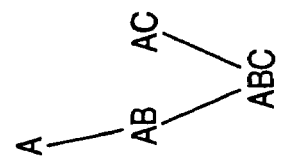
FIG. 2 illustrates a tree to represent group-by operations on multiple levels of grouping sets.

A process of computing aggregates on distinct values for multiple grouping sets in accordance with one embodiment assumes that different levels of grouping sets are linked together in the form of a tree. The tree includes nodes interconnected by edges, where each node represents a group-by operation on a corresponding grouping set. Each edge defines which lower grouping level is to be used to compute the next higher grouping level. Thus, as shown in FIG. 2, an example tree includes multiple nodes (ABC, AB, AC, A) linked together by edges (represented by lines). Node ABC represents a group-by on the grouping attributes A, B, C; node AB represents a group-by on grouping attributes A, B; node AC represents a group-by on grouping attributes A, C; and node A represents a group-by on grouping attribute A.

Node ABC is considered to be the lowest level node representing the lowest level group-by operation. Node A is the highest level node representing the highest level group-by operation. In the illustrated example of FIG. 2, each of the group-bys on AB and AC are calculated from the result of the lowest level group-by on ABC. The group-by on A is calculated from the result of the group-by on AB. Note that the group-by on A can also be alternatively calculated from the result of the group-by on AC.

As noted above, where no DISTINCT expression is present in a query specifying multiple grouping sets, the group-by of a child can be easily computed from the result of a lower level group-by without special processing. For example, a group-by on A or a group-by on B can be calculated from the result of a group-by on A, B. In turn, the group-by on A, B can be computed from the result of a group-by on A, B, C.

However, if a DISTINCT expression is present in the query specifiying multiple grouping sets, then the approach above is not available. Instead, in accordance with some embodiments of the invention, the DISTINCT aggregate computation is considered as a two-step process. The following query:

SELECT A, B, SUM(DISTINCT g)
GROUP BY A, B;

becomes

SELECT A, B, g
GROUP BY A, B, g;

(with the result placed into a spool file) followed by

SELECT A, B, SUM(g)
GROUP BY A, B;

where the last statement is performed on the spool file containing the result of the second query above. The spool file contains distinct values of g from which higher-level group-bys can be computed (so that computing such higher-level group-bys from original tables can be avoided). From the spool file containing distinct values, a group-by on A, g or a group-by on B, g can be computed from the result of a group-by on A, B, g. Similarly, the group-by on A, B, g can be computed from a lower level group-by result, such as the result for the group-by on A, B, C, g.

FIG. 3 is a flow diagram of a process of computing aggregates on distinct attribute values for multiple levels of grouping sets, in accordance with an embodiment. The original query to be computed is initially stored in a data structure named QUERY. The process also defines a data structure representing a queue, labeled WAITQUEUE. Initially, WAITQUEUE is set to empty (at 202). Next, for the current grouping set (starting with the lowest grouping set identified by the tree representing the multiple level grouping operation), the database system 10 forms (at 204) the query that computes the spool containing the distinct values for each group. In one example, assume an original query (referred to as "Query 1") as follows:

SELECT g1, g2, SUM(DISTINCT a) (Query 1)
FROM T
GROUP BY g1, g2→g1;

Note that the symbol → is not actually proper SQL syntax—it is provided to illustrate that the group-by on g1 is to be calculated from the result of the group-by on g1, g2. Query 1 specifies two grouping sets: g1, g2, and g1. The data structure QUERY is set to Query 1.

From the query (Query 1) contained in the data structure QUERY, the query formed at 204 (Query 2) is as follows:

SELECT g1, g2, a (Query 2)
FROM T
GROUP BY g1, g2, a;

The query formed at 204 calculates the distinct values of the attribute a that is specified in the aggregate function SUM (DISTINCT a). A spool file is then assigned (at 206) to store the result of the query created at 204. In this example, the spool file is labeled SPOOL1.

The database system 10 then maps (at 208) the query (Query 1) contained in the data structure QUERY onto the spool storing the distinct values of the attribute in the aggregate function without the DISTINCT option. This mapping of the original query causes the formation of another query (Query 3). In the example given, Query 3 is as follows:

SELECT g1, g2, SUM(a) (Query 3)
FROM SPOOL1
GROUP BY g1, g2

Note that the query above specifies a group-by operation on the grouping set g1, g2, with the aggregate SUM calculated for all values of the attributes a in the spool file SPOOL1. The output results of the query created at 208 are the desired results of the original query for the grouping set g1, g2.

The database system 10 then forms (at 210) further queries for each of the remaining grouping set(s) that is a child of the current grouping set. In the tree of FIG. 2, the child of ABC includes the grouping sets AB, AC, and A. However, in the example given above (Query 1), there is only one such child query that needs to be formed, since there are only two grouping sets g1, g2 and g1. The child query that is formed (at 210) for this example is as follows:

SELECT g1, ?, SUM(DISTINCT a) (Query 4)
FROM SPOOL1
GROUP BY g1

Note that the symbol ? indicates that a null value is to be inserted in the result table for the column g2. The child query (or multiple child queries if applicable) are then stored into the data structure WAITQUEUE (at 212). The plans to evaluate the queries formed at 204 and 208 are then generated (at 214), such as by the parser in the parsing engine 110.

Next, if the database system 10 determines (at 216) that the content of WAITQUEUE is not empty, then the query to be processed (QUERY) is set to the first query in WAITQUEUE (at 218). In this example, the first query of WAITQUEUE is Query 4 above. Next, the query of WAITQUEUE moved into the data structure Query is removed from WAITQUEUE (at 220). The acts of 204-216 are repeated for this next query and for all remaining queries in WAITQUEUE.

For Query 4, the distinct value of the attribute a for each group defined by the grouping set g1 is computed according to the following query (created at 204):

SELECT g1, ?, a (Query 5)
FROM SPOOL1
GROUP BY g1, a

The results of Query 5 are assigned for storage in a spool table SPOOL2 (at 206). Note that the intermediate spool file SPOOL1 is reused plural times in this example: once to compute aggregates for groups defined by the grouping set g1, g2 (QUERY 3); and once in a child query to compute aggregates for groups defined by a higher level grouping set g1, (QUERY 4). Next, Query 4 is mapped to SPOOL2 (at 208) without the DISTINCT option to produce the following query:

SELECT g1, ?, SUM(a) (Query 6)
FROM SPOOL2
GROUP BY g1

Query 6 above computes the results for the group-by on grouping set g1.

If WAITQUEUE is empty (as determined at 216), then all necessary plans for calculating the original query have been created, and at this point, can be submitted to the access modules 108 for execution (at 222). Note that the database system 10 does not have to wait for all plans to be created before submission to the access modules 108. In fact, it may be more efficient for the parsing engine 110 to submit the executable steps of respective plans to the access modules 108 as they are generated.

The ability to reuse an intermediate spool file containing distinct values of an attribute specified in the aggregate function of the original query for computing results for a lower level group-by as well as for a higher-level group-by enables more efficient computation than if the group-bys are all computed from a base table, such as table T in the example above.

The database system discussed above includes various software routines or modules (such as the access modules 108 and parsing engine 110). Such software routines or modules are executable on microprocessors, microcontrollers, or other control or computing devices. As used here, a "controller" refers to a hardware component, software component, or a combination of the two. A "controller" can also refer to plural hardware components, software components, or a combination of hardware components and software components.

Instructions of the software routines or modules are stored one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; or optical media such as compact disks (CDs) or digital video disks (DVDs).

The instructions of the software routines or modules are loaded or transported to each system in one of many different ways. For example, code segments including instructions stored on floppy disks, CD or DVD media, a hard disk, or transported through a network interface card, modem, or other interface device are loaded into the system and executed as corresponding software routines or modules. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executable by at least one processor in a database system, comprising:
   receiving, by the at least one processor, a query that specifies an aggregate on distinct values of at least one attribute, the query further specifying grouping on plural grouping sets, the plural grouping sets having at least a first grouping set and a second grouping set;
   identifying, by the at least one processor, distinct values of the at least one attribute and storing the distinct values of the at least one attribute in a first table;
   computing, by the at least one processor, aggregates for groups specified by the first grouping set using the first table; and
   computing, by the at least one processor, aggregates for groups specified by the second grouping set using the first table.

2. The method of claim 1, wherein the first grouping set is lower level grouping set than the second grouping set, and wherein the first grouping set has a larger number of attributes than the second grouping set.

3. The method of claim 1, wherein identifying the distinct values of the at least one attribute comprises computing a group-by operation on the first grouping set and selecting the attributes of the first grouping set for output.

4. A method executable by at least one processor in a database system, comprising:
   receiving, by the at least one processor, a query that specifies an aggregate on distinct values of at least one attribute, the query further specifying grouping on plural grouping sets, the plural grouping sets having at least a first grouping set and a second grouping set;
   identifying, by the at least one processor, distinct values of the at least one attribute and storing the distinct values of the at least one attribute in a first table;
   computing, by the at least one processor, aggregates for groups specified by the first grouping set using the first table; and
   computing, by the at least one processor, aggregates for groups specified by the second grouping set using the first table,
   wherein identifying the distinct values of the at least one attribute comprises computing a group-by operation on the first grouping set and selecting the attributes of the first grouping set for output,
   wherein storing the distinct values of the at least one attribute in the first table comprises storing the distinct values of the at least one attribute in a spool file.

5. A method executable by at least one processor in a database system, comprising:
   receiving, by the at least one processor, a query that specifies an aggregate on distinct values of at least one attribute, the query further specifying grouping on plural grouping sets, the plural grouping sets having at least a first grouping set and a second grouping set;
   identifying, by the at least one processor, distinct values of the at least one attribute and storing the distinct values of the at least one attribute in a first table;
   computing, by the at least one processor, aggregates for groups specified by the first grouping set using the first table; and
   computing, by the at least one processor, aggregates for groups specified by the second grouping set using the first table,
   wherein identifying the distinct values of the at least one attribute comprises computing a group-by operation on the first grouping set and selecting the attributes of the first grouping set for output,
   using the first table to identify distinct values of the at least one attribute for groups defined by the second grouping set; and
   storing the distinct values of the at least one attribute for the groups defined by the second grouping set in a second table.

6. The method of claim 5, wherein computing aggregates for the groups specified by the second grouping set is based on the second table.

7. The method of claim 6, wherein identifying distinct values of the at least one attribute for groups defined by the second grouping set comprises computing a group-by operation on the first able based on the second grouping set and selecting one or more attributes of the second grouping set for output.

8. An article comprising at least one machine-readable storage medium containing instructions that when executed cause a system to:
   receive a query that specifies an aggregate on distinct values of at least one attribute, the query further specifying grouping on plural grouping sets, the plural grouping sets having at least a first grouping set and a second grouping set;
   identify distinct values of the at least one attribute and storing the distinct values of the at least one attribute in a first table;
   compute aggregates for groups specified by the first grouping set using the first table; and
   compute aggregates for groups specified by the second grouping set using the first table.

9. The article of claim 8, wherein the first grouping set is lower level grouping set than the second grouping set, and wherein the first grouping set has a larger number of attributes than the second grouping set.

10. The article of claim 8, wherein identifying the distinct values of the at least one attribute comprises computing a group-by operation on the first grouping set and selecting the attributes of the first grouping set for output.

11. The article of claim 10, wherein storing the distinct values of the at least one attribute in the first able comprises storing the distinct values of the at least one attribute in a spool file.

12. An article comprising at least one machine-readable storage medium containing instructions that when executed cause a system to:
   receive a query that specifies an aggregate on distinct values of at least one attribute, the query further specifying grouping on plural grouping sets, the plural grouping sets having at least a first grouping set and a second grouping set;

identify distinct values of the at least one attribute and storing the distinct values of the at least one attribute in a first table;

compute aggregates for groups specified by the first grouping set using the first table; and compute aggregates for groups specified by the second grouping set using the first table;

wherein identifying the distinct values of the at least one attribute comprises computing a group-by operation on the first grouping set and selecting the attributes of the first grouping set for output;

use the first table to identify distinct values of the at least one attribute for groups defined by the second grouping set; and store the distinct values of the at least one attribute for the groups defined by the second grouping set in a second table.

13. The article of claim 12, wherein computing aggregates for the groups specified by the second grouping set is based on the second table.

14. The article of claim 13, wherein identifying distinct values of the at least one attribute for groups defined by the second grouping set comprises computing a group-by operation on the first able based on the second grouping set and selecting one or more attributes of the second grouping set for output.

15. A database system comprising:
a machine-readable storage to store a table; and
at least one processor to:

receive a query that specifies a calculation of an aggregate on distinct values of an attribute in the table, the query to specify group-by operations on plural grouping sets;

in processing the query, compute intermediate values for storage in an intermediate spool; and use the intermediate values in the intermediate spool for computing results of at least two group-by operations on at least two corresponding grouping sets.

16. The database system of claim 15, wherein the query comprises a Structured Query Language (SQL) SELECT statement containing a GROUP BY clause specifying multiple grouping sets.

17. The database system of claim 15, wherein the query specifies group-by operations on plural grouping sets at multiple grouping levels.

18. The database system of claim 15, further comprising database management software executable on the at least one processor to perform the receiving, computing, and using acts.

19. The database system of claim 18, wherein the database management software comprises plural access modules, and the storage comprises plural storage modules accessible by the plural access modules in parallel.

20. The database system of claim 19, further comprising plural processors, the access modules executable on the processors.

* * * * *